Aug. 29, 1961 F. R. STRATE 2,998,322
METHOD OF HARD FACING METAL
Filed Dec. 31, 1957

INVENTOR.
Frank R. Strate,
BY
Beau, Brooks, Buckley & Beau
ATTORNEYS.

2,998,322
METHOD OF HARD FACING METAL
Frank R. Strate, 7477 Broadway, Alden, N.Y.
Filed Dec. 31, 1957, Ser. No. 706,472
8 Claims. (Cl. 117—22)

This invention relates to the art of metallurgy and more particularly to an improved method for producing a hard faced heterogeneous metal and carbide structure.

In the manufacture and maintenance of earth formation cutting tools such as plow points and harrowing discs, and for other similarly highly abrasive duties, it is an economic necessity to provide a face surface of the highest practicable hardness. Accordingly with the advent of commercial availability of hard carbides and the like, particularly tungsten carbide, many efforts have been made to employ these materials for providing a surface hardness of the requisite value. Since these materials are practically unworkable, and also because they are brittle and low in impact resistance, it is the usual practice to form the tool body from mild steel or the like and to apply the tungsten or other carbide to the surface thereof. One method of armoring metal faces in this manner has been to melt a puddle in the surface of the metal to be hard faced and manually to sink pieces of tungsten carbide therein, and/or to tie such pieces of carbide one by one to the base metal by the building up of weld metal therearound. Since the pieces of tungsten carbide are handled manually according to this method, it is obvious that the procedure is subject to being irregular and is at best tedious.

Accordingly, various means have been tried to apply tungsten carbide powder to a steel base piece. However, in order to retain the powder satisfactorily, it has been found necessary to have a considerable depth of base metal for puddling or to employ a matrix metal which will thoroughly embrace and wet the small carbide particles. This matrix material, being exposed to the wear, should have a hardness as high, and should be as abrasive resistent, as practicable, since as soon as it has worn away from around a carbide particle, that particle will drop off the tool or other part to the same effect as if it had worn off.

The most successful means of applying the matrix and powdered carbide has been by the use of tubular welding rods having a sheath of the matrix metal filled with tungsten carbide powder of the desired screen size. This method presents a difficulty however, since problems of fabricating the rod sheath limit the sheath steel hardness to steels that can be formed into tubes, i.e. to that of mild steel, and even though some of the carbide becomes dissolved in the matrix metal during application, the hardness of the final matrix is limited to about 45 Rockwell "C." Additionally, the use of the filled welding rod requires a very considerable amount of skill since puddling or mixing of the rod in or with the parent metal should be avoided in most cases, and at the same time care must be exercized to lay down an even deposit while endeavoring to create a uniform mixture of the ingredients flowing from the separately disintegrating columns of rod sheath and rod filler material.

In accordance with the present invention the tungsten carbide powder is uniformly mixed with the matrix metal before being applied to the workpiece. To this end, the matrix material itself is also in powdered form. This permits use of matrix alloys of high hardness and enables a deposit of a uniform mixture of matrix metal and carbide in an expeditious manner. In carrying out the process of the present invention the matrix metal and carbide powders may be premixed, and this mixture may be fed through the metering and dispensing apparatus of a powder welding machine, or the two powders may be metered by separate feeding machines into a common outlet of the welding apparatus, or the matrix alloy and carbide particles may be formed in a metallurgical frit which is powdered and fed through such powder welding apparatus. In any case a matrix alloy of virtually any hardness may be utilized, so long as the melting characteristics thereof are suitable and compatible with the carbide, and the mixture of the matrix metal with the carbide particles is uniform as applied; and the carbide particles being in intimate contact with the matrix material, the two are thoroughly wet together for secure retention of the carbide particles in the matrix.

Accordingly only minimum surface melting of the parent metal body need be effected, so that a minimum loss of the hard surfacing material to the parent body results and thin parent bodies may be utilized. For this reason it is preferable to employ a flame type powder welding apparatus wherein the particles of powder will be softened in transit to the parent metal for enhancing the intimate contact between themselves and for minimizing the need for further heating on the parent metal surface. This process results in the fabrication of a metal structure in which the parent metal is substantially unchanged and has applied to it a layer of substantially uniform mixture of hard alloy matrix containing a uniform distribution of carbide particles. Since no binder or like means are needed to retain the carbide particles at any stage of the process save the matrix metal itself, the hard faced layer is for all practical purposes slag free.

Accordingly it is an object of the invention to provide an improved method for producing a metal and abrasive grain structure.

It is another object of the invention to provide an improved method of applying a powered tungsten carbide bearing surface to a parent metal body.

Further objects of the invention are to provide a method for producing a material as aforesaid wherein the carbide particles are firmly retained in a matrix of very high hardness.

An additional object of the invention is to provide a method as aforesaid in which the hard facing procedure can be carried out rapidly and expeditiously with a minimum of skill and training while providing a product of a high degree of uniformity and chemical purity.

Other objects of the invention will be apparent from the following description and claims, and from the drawings wherein:

Figure 1:
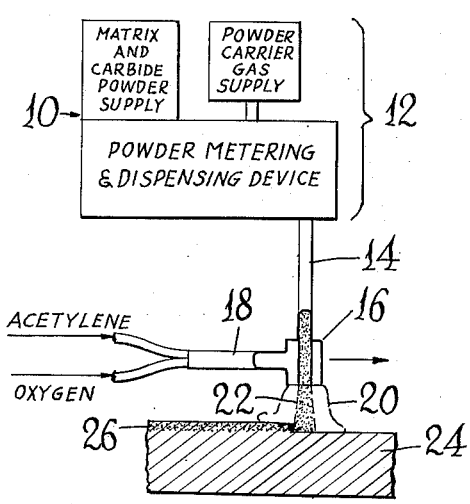
FIG. 1 is a diagrammatic showing illustrative of one general form of the method of the invention.

Referring more particularly to the drawing, the apparatus in FIG. 1 may be employed to carry out a preferred form of the method of the invention wherein powdered alloy matrix metal is premixed with powdered carbide such as tungsten carbide and fed through a powder welding machine 10 having a constant rate powder metering and discharge apparatus 12 such as to feed a smoothly flowing powder stream through a conduit 14 which is continuous with a central bore of the head 16 of a torch 18, the torch head being provided with oxyacetylene flame orifices providing flame 20 embracing the stream of powder 22 as the same is discharged from the torch head onto a workpiece 24. Accordingly, as the torch is moved relative to the workpiece 24 thereacross from left to right in the figure, a uniform layer 26 of matrix metal containing uniformly entrained carbide particles is laid down and welded to the workpiece 24. A powder welding apparatus especially suited to employment in accordance with this method is described and claimed in applicant's copending U.S. patent application Serial No. 421,148, filed April 5, 1954, now Patent No. 2,900,138.

Preferably the powder welding machine 10 is adjusted so that the powder delivery velocity in the free jet or powder stream 22 is as low as practicable, merely sufficient to maintain suspension of the powder in the stream, since the particulate carbide remains unmolten and it is desirable to minimize rebound of the same from the workpiece 24. However, in any case such rebound is minimized by the cohesion of the carbide particles to the molten matrix metal and the cohesion of the latter to the parent metal 24.

For insuring this cohesion as well as for maintaining continued uniform mixture of the matrix metal and the carbide, it is preferred that the flame 20 be of a length and heat partially to melt the matrix powder during its transit in the free stream 22. In any case the preferred powder stream embracing or surrounding distribution of the flame serves to preheat the surface of the workpiece 24 in advance of the welding operation, preferably to a thinly molten or so-called "sweating" state, and to complete the fusion of the matrix metal particles to each other and to the workpiece immediately rearwardly of the advancing point of powder deposit.

A wide variety of abrasives such as carbides may be deposited in accordance with the invention in a wide variety of matrix metals. For example, chromium-boron carbides may be utilized, but the preferred hard particulate material is powdered tungsten carbide. While the method of the invention enables the use of almost any matrix material suitable for the temperature and wear qualities required in a particular case, it finds its greatest advantage in the use of extremely hard matrix alloys of a martensitic nature, such as chromium-carbon-molybdenum-manganese iron base alloy, or in the use of hard, tough austenitic iron base matrix alloys.

Figure 3:
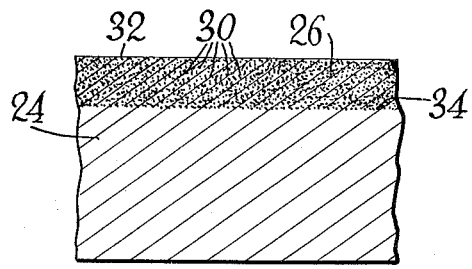
FIG. 3 is a diagrammatic sectional showing, on an enlarged scale, of a heterogeneous base metal, alloy matrix metal and particulate carbide product prepared by employment of the general method of the invention.

One example of the method of the invention is as follows:

A powder feeding and welding apparatus of the type shown and described in the aforesaid copending application Serial No. 421,148 was charged with a uniform mixture 50% by weight tungsten carbide of 40/100 mesh and 50% by weight of powdered matrix metal of iron base alloy containing 10.47% chromium, 1.03% carbon, 0.53% molybdenum and 0.40% manganese screened to 40 mesh. The feeding mechanism was adjusted as aforesaid to deliver this powder from the torch powder orifice with minimum rebound, and the oxyacetylene flame of the torch was adjusted to an excess of acetylene providing an acetylene feather longer than the inner cone, with the overall flame being adjusted to heat the workpiece to the aforesaid "sweating" temperature. With the torch and powder feed so adjusted, the torch was moved at a rate to deposit a matrix and carbide layer 26, ⅛ inch thick, on a mild steel workpiece 24. This procedure resulted in a uniform deposit having a hardness equivalent to about 55 Rockwell "C" for the steel matrix, with the equivalent to over 80 Rockwell "C" for the tungsten carbide particles themselves. As shown in FIG. 3 the carbide particles 30 of the layer 26 were firmly and adhesively held in uniform distribution in the matrix 32 with this uniform mixture being welded to but essentially unmixed with the surface 34 of the base or parent metal.

In other tests it has been found that the powder mixture may contain some 30 to 70% by weight tungsten carbide with the remainder being powdered matrix alloy, and that the carbide particle size may be varied from 200/300 to 8/40 mesh with good results, it being desirable that the matrix metal particle size be of the same order but preferably not more than approximately 40 mesh to enable thorough softening of the matrix metal particles during transit in the flame to prevent loss through rebound.

As in the aforementioned copending patent application Serial No. 421,148, the powder preferably is delivered in a stream of carrier gas. It is preferred that this gas be inert, such as helium, although other relatively chemically inactive or reducing gases may be used, as will be understood.

Alternatively, the apparatus arrangement of FIG. 1, and the method described in connection therewith, may be employed with a powdered metallurgical frit composed of the matrix alloy and the carbide particles. While this variation in the process involves the additional steps of preparation of the frit and the powdering thereof, it insures absolute maintenance of the uniform distribution of the carbide particles in the powdered matrix metal during handling of the powder. However it will be seen that use of the powdered frit is the same in effect as the uniform mixture of discreet powder particles of matrix alloy and carbide aforedescribed. It will be understood that the frit powder particles will necessarily be somewhat larger screen size, preferably within the range of about 8 to 300 indicated above, than the carbide particles forming a constituent part thereof.

Figure 2:
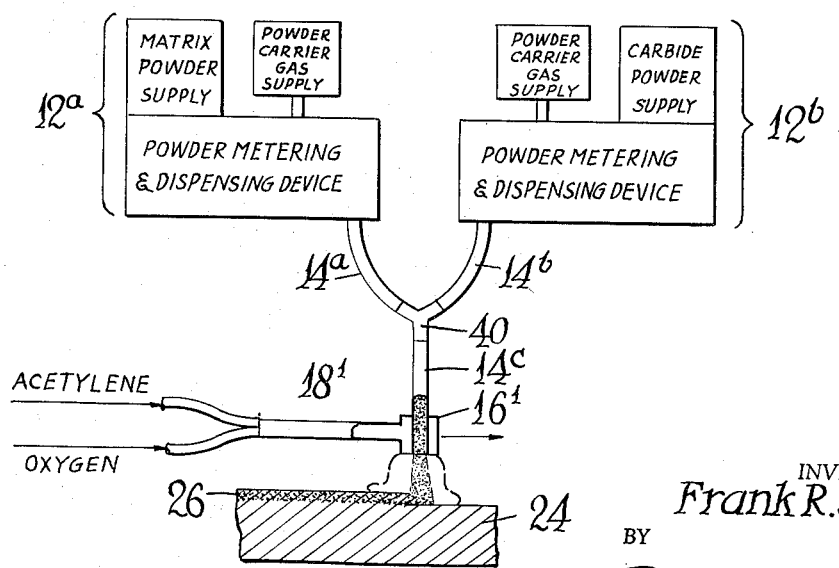
FIG. 2 is a diagrammatic showing illustrative of another form of the method of the invention, wherein matrix alloy powder and carbide powder are fed by separate feed mechanisms.

As a second alternative method of producing the product described in connection with FIG. 3 above, the powder supply may be derived from separate matrix powder and carbide powder feeding and metering machines as shown diagrammatically in FIG. 2 at 12a and 12b having powder (or, preferably, carrier gas-powder as shown) discharge conduits 14a and 14b joined by a Y coupling 40 emptying into the powder delivery passage of a torch head 16' of a torch 18', which may be identical to the torch 18 of FIG. 1. The powder delivery machines 12a and 12b may be of the type shown and described in the forementioned copending application Serial No. 421,148, the powder streams being mixed in the Y coupling 40 to become in effect the same as the premixed powder stream in the conduit 14 of the arrangement of FIG. 1. To insure the formation of a uniform mixture in the combined powder stream, it is preferred in some cases that the mixing coupling 40 be spaced somewhat upstream of the torch head 16', as by a conduit 14c, depending on the effectiveness of the other powder mixing elements such as the powder delivery bore of the torch head itself. It will be seen that the operation of the apparatus of FIG. 2 will be in all other respects identical to that described in relation to the premixed powder method of FIG. 1.

While the flame 20 is the preferred source of heat for fusing the matrix powder into solid layer and to the parent metal surface, it should be understood that other sources of heat, such as induction heat, could be used for this purpose in lieu of or in addition to the flame. Also while it is preferred that the matrix be completely fused as it is applied, it is within the purview of the invention to complete the fusing operation in a later process step, using any convenient source of heat.

While only a few forms of the general method of the invention, and only one type of product produced by the same, have been illustrated and described in detail, it will be understood that the invention is not limited thereto but may be otherwise practiced within the spirit of the invention and the scope of the appended claims.

What is claimed is:

1. The method of hard facing a workpiece metal body which comprises providing hard facing material in powdered form, said material comprising matrix metal and hard carbide, said powdered material containing a uniform dispersal of the matrix metal and carbide, and issuing a stream of said powdered material onto the surface of said body to be hardfaced in the presence of a flame surrounding said stream, said flame being sufficiently hot to sweat the metal of the workpiece and partially to melt said matrix metal but not said carbide, said body being moved relative to said stream and the surrounding flame whereby said stream and flame advance along said surface with said flame preheating said surface in advance of said stream and fusing the deposited hard facing material behind the advancing stream and then permitting the workpiece and deposited metal to cool and form a heterogeneous deposit on said workpiece consisting of the carbide particles held in uniform distribution in the matrix metal.

2. The method of claim 1 wherein the powdered hard facing material comprises a uniform mixture of matrix metal alloy powder and hard carbide powder.

3. The method of claim 2 wherein the powdered hard facing material is issued onto the workpiece metal body by a powder welding apparatus having means metering the powder and conveying the metered powder for the issuance thereof onto the workpiece suspended in a stream of non-oxidizing gas.

4. The method of claim 3 wherein the matrix metal powder and the carbide powder first are metered separately and suspended in separate streams of said gas and then said separate streams are combined to form a common stream prior to said issuance onto said workpiece.

5. The method of claim 1 wherein the powdered hard facing material is a powdered metallurgical frit comprising hard carbide particles and matrix metal.

6. The method of claim 5 wherein the powdered hard facing material is issued onto the workpiece metal body by a powder welding apparatus having means metering the powder and conveying the metered powder for the issuance thereof onto the workpiece suspended in a stream of non-oxidizing gas.

7. The method of hard facing a workpiece metal body which comprises providing hard facing material in powdered form, said material comprising matrix metal and high temperature resistant abrasive, said powdered material containing a uniform dispersal of the matrix metal and the abrasive, and issuing a stream of said powdered material onto the surface of said body to be hardfaced in the presence of heat sufficient to sweat the metal of the workpiece and partially to melt said matrix metal but not said carbide, said body being moved relative to said stream and the heat being applied to bring said surface to a sweating temperature in advance of said stream and to fuse at least partially said matrix metal into a layer on said surface with said abrasive powder entrained therein while said surface remains at sweating temperature and then permitting the workpiece and deposited metal to cool and form a heterogeneous deposit on said workpiece consisting of the carbide particles held in uniform distribution in the matrix metal.

8. The method of hard facing a workpiece metal body which comprises providing hard facing material in powdered form, said material comprising hard alloy matrix metal and hard carbide, said powdered material containing a uniform dispersal of the matrix metal and carbide, and issuing a stream of said powdered material onto the surface of said body to be hardfaced in the presence of heat applied to said stream and to said surface, said heat being sufficient to sweat the metal of the workpiece and partially to melt said matrix metal but not said carbide, said body being moved relative to said stream, and said heat being adapted and applied to bring said surface to sweating temperature in advance of said stream and to fuse partially the matrix powder prior to impact of the same against said surface and then permitting the workpiece and deposited metal to cool and form a heterogeneous deposit on said workpiece consisting of the carbide particles held in uniform distribution in the matrix metal.

References Cited in the file of this patent

UNITED STATES PATENTS

| | | |
|---|---|---|
| 1,128,059 | Schoop | Feb. 9, 1915 |
| 1,977,128 | Hawkins | Oct. 16, 1934 |
| 2,049,575 | Sutton | Aug. 4, 1936 |
| 2,261,228 | Cockrum | Nov. 4, 1941 |
| 2,674,542 | Alexander | Apr. 6, 1954 |
| 2,800,419 | Kough | July 23, 1957 |